Patented May 16, 1950

2,508,262

UNITED STATES PATENT OFFICE 2,508,262

TANK LINING MATERIAL

Alfred Joseph Jennings, Bridgeport, and Verl Edward Luzena, Fairfield, Conn., assignors to E. I. du Pont de Nemours & Company, Wilmington, Del., a corporation of Delaware No Drawing. Application August 22, 1947, Serial No. 770,198

9 Claims. (Cl. 220—63)

This invention relates to metal containers and particularly to metal containers having a corrosion proof lining which is resistant to acids, alkalis, oxygen-releasing compounds and water, and more particularly to the lining material made by either the calendering or extruding processes.

The problem or prevention of corrosion of metal containers and duct-work employed in the handling of many industrial chemicals has attracted many workers, and many solutions to the problem have been proposed. To overcome the corrosion of metal containers such as tank cars, barrels, cans, mixing and reaction kettles, duct work, etc., they have been lined with glass, various elastomers such as, e. g., rubber, neoprene and polyisobutylene and synthetic resins, such as, e. g., polyvinyl chloride and copolymers of vinyl chloride and other polymerizable monomers. The glass lining, while entirely satisfactory with respect to corrosion and dimensional stability, will chip and crack easily and allow the corrosive chemicals to attack the metal container. The synthetic resin liners are not entirely satisfactory since they are not resistant to a wide variety of chemicals and present serious fabricating problems.

The elastomers are made into lining material by compounding with fillers, pigments, reinforcing agents, accelerators, stabilizers, etc., and then calendered or extruded in the form of flat sheets of various thicknesses. These methods of preparing the sheets with the elastomers result in strains in the film in the longitudinal direction of the calendered or extruded sheet due to the nerve or elasticity of the elastomer, which cause the sheet to change dimensions as the stresses and strains are released.

The sheets of rubber, polychloroprene, polyisobutylene and other elastomers prepared by the calender or extruding process overcome the shortcoming of the glass lining, such as cracking and chipping, but are deficient in that the lining material is not dimensionally stable due to the strains in the film, and when a tank is lined with such material, the lining will shrink and pull away from the metal container particularly at the seams, thus exposing the walls of the container to the corrosive chemicals.

In order to meet all the requirements of a tank lining, the uncured sheet must be sufficiently pliable to facilitate fabrication, have a curing system which will give a good cure at relatively low temperatures after the sheet is installed in the tank or container, not shrinking or distorting upon heating and be resistant to acids, alkalis and salts.

It is an object of this invention to provide a tank lining material made by the calender or extrusion processes which will not change dimensions after being installed as a tank lining. A further object of this invention is to provide a means for the prevention of the formation of strains or stresses in a calendered film which cause it to change dimensions after it has been calendered out in the form of a sheet or film. A still further object is to provide a calendered sheet of an elastomer which has dimensional stability together with all the other requisite properties of a tank lining material, such as, e. g., being readily bonded to metal surfaces, resistant to the corrosive action of any concentration of acids, alkalis, salts or aqueous liquids.

The objects of the present invention are accomplished by incorporating a relatively small proportion of finely divided siliceous mineral (sodium aluminum silicate) particles having plate-like form in a calenderable or extrudable elastomer compound formulated for use as a tank lining material, the siliceous mineral being present in sufficient quantity to give dimensional stability and insufficient quantity to have a detrimental effect on the other requisite properties of tank lining material.

The elastomer compound containing the siliceous mineral is calendered out in the form of a sheet or film of uniform thickness and then suitably adhered to the inside of a corrodible duct or container.

The following detailed example is given by the way of illustration and not limitation. In the example the parts are by weight.

Example

| | |
|---|---|
| Polychloroprene | 100.0 |
| Finely divided sodium aluminum silicate plates | 2.5 |
| Medium thermal carbon black | 125.0 |
| Petroleum oil (Circo light process oil) | 10.0 |
| Stearic acid | 0.5 |
| Phenyl beta naphthylamine | 1.0 |
| Petrolatum | 1.0 |
| Litharge | 10.0 |
| Tetra methyl thiuram monosulfide | 1.0 |

A suitable sodium aluminum silicate for use in the formula is calculated to be:

$$(Na_2O)\,0.92\,Al_2O_3\,(SiO_2)\,8.7\,\tfrac{1}{2}H_2O$$

The bulk value is 4 to 5 pounds per cubic foot.

The preferred silicate is obtained from the mineral perlite which occurs in the form of hollow spheres and is from a glass-like lava deposit.

The Circo light process oil is a pure hydrocarbon naphthene base distilled petroleum lubricating oil having a viscosity of 155 sec. Saybolt at 100° C., and a B. P. between 550° F. and 820° F.—90% boiling below 775° F. It is a thin very light amber colored oil very much like 10 W automobile lubricating oil in appearance. The hollow spheres are ground by any known means before incorporating into the above composition.

The polychloroprene is pre-masticated on a two roll mill and is allowed to rest at least 24 hours until it has a Mooney viscosity of 30 prior to adding other components. The siliceous mineral is thoroughly dispersed throughout the polychloroprene before adding the remaining ingredients. The remaining ingredients except the litharge, are added in the order listed, while being masticated on a two roll mill. In order to prevent scorching or premature curing, the temperature of the composition is held down by running cold water through the milling rolls. After the composition is thoroughly milled and homogeneous, it is taken from the mixing mill in the form of thick slabs and quenched in cold water to prevent scorching. The litharge is withheld from the composition until it is subsequently warmed on a two roll rubber mill prior to calendering out in the form of flat sheets. The mass is allowed to age for at least five days before calendering. After the aging period, the mass is remasticated and heated on a two roll mill, at which time the litharge is added and the milling continued until it is thoroughly dispersed and in a semi-solid plastic state, and then transferred to a three roll heated calender (minimum temperatures—top roll 155° F., middle roll 135° F., bottom roll 170° F.) where it is calendered out on a temporary support of Holland cloth to a thickness of 0.125", which corresponds to a weight of 140.2 ounces per square yard.

The Holland cloth support for the calendered film is a finely woven cotton fabric thoroughly impregnated with a water soluble coating having a smooth highly calendered surface to which the polychloroprene calendered sheet adheres only lightly.

The calendered uncured sheet may be used immediately for lining metal containers for storage of corrosive chemicals, or it may be stored and shipped to another location for lining metal containers.

When tested by the method as outlined below, the above described calendered sheet showed a maximum shrinkage of 0.60%, whereas a calendered sheet prepared in exactly the same manner except that the siliceous mineral was omitted from the calender compound, showed a maximum shrinkage of 12.51%.

When the above described calendered sheet is adhered to the inside of a metal container, the Holland cloth is first removed from the calendered sheet. The metal surface to which the neoprene sheet is to be adhered, such as iron or steel, previously is prepared by sand-blasting and then applying a thin solution of chlorinated rubber dispersed in suitable organic solvents. After the solvent has evaporated, a second primer coat of a polychloroprene or neoprene solution is applied over the chlorinated rubber surface and the volatile solvent allowed to evaporate. One surface of the above described calendered sheet with the Holland cloth removed is treated with a hydrocarbon solvent for the polychloroprene, such as xylol or toluol, to render the surface slightly tacky. When the solvent treated surface has reached the proper degree of tack, determined by the formation of "legs" when touched by the finger and gently pulled away, it is brought in contact with the previously primed metal surface. The neoprene sheet is then pressed against the primed metal surface with hand rollers. Seams are prepared by overlapping the neoprene sheet and cementing the overlapped portion with a suitable neoprene curing cement. The overlapped seam is then painted with a neoprene cement and a thin strip of the neoprene sheet in the form of tape slightly wider than the overlapped portion is adhered to the seam.

After the metal container is completely lined, it is given a final heat treatment by gradually raising the temperature from room temperature to approximately 220° F. over a period of approximately four to five hours. The temperature is then held at 220° F. for a period of ten to fifteen hours to cure the lining, cements and primer coats completely. After the curing operation the container may be used for the storage of corrosive chemicals, such as mineral acids, alkalis and aqueous liquids, without the metal container becoming corroded.

The following test procedure may be used for determining the dimensional stability of the calendered sheet before installing as a tank lining. A test specimen in the form of a disc of five inch diameter is cut from the uncured calendered sheet attached to the Holland cloth at any location selected at random. The Holland cloth is removed from the calendered sheet and all surfaces of the calendered sheet are dusted with talc or any other suitable anti-blocking agent. The dusted disc is next placed in a warm air oven at 200° F. (93° C.) for a period of fifteen minutes (plus or minus one minute). The supporting member for the disc shall be a clear glass plate dusted with sufficient talc so that no adhesion is obtained between the disc and the glass plate, thus allowing the free movement of the disc on the glass plate due to the release of the stresses or strains in the calender sheet which takes place during the heating period. The disc is removed from the oven after the exposure period and allowed to cool to room temperature. Eight diameters of the disc are measured at 22½° intervals before and after heating and the percentage change in diameter lengths recorded. The maximum shrinkage for any one diameter should not be more than 8% for use as tank lining material. The disc cut from the calendered sheet will change to the form of an ellipse with shrinkage taking place in the calender direction of the sheet and expansion taking place in the direction at right angle to calender direction.

In order to establish the preferred operating range for the ratio of sodium aluminum silicate to polymer, the following compositions were prepared and calendered in the form of sheets on Holland cloth in the same manner as described above. The ingredients of the compositions listed below are the same as those in the preferred example and are on the basis of parts by weight. The volume loading of the compositions containing the sodium aluminum silicate and carbon black as well as those containing mixtures of the two is substantially the same for the different compositions. The volume loading is based on the specific gravity of the sodium aluminum silicate at 1.52 and the carbon black at 1.80.

as tensile strength, elongation, resistance to volume increase after immersion in water, sodium hydroxide and hydrochloric acid. The useful limits of the mineral and polymer for the purposes of this invention may vary between 1 part

|  | Composition, Parts by Weight ||||||||||
|---|---|---|---|---|---|---|---|---|---|---|
|  | A | B | C | D | E | F | G | H | I | J |
| Polychloroprene | 100.0 | 100.0 | 100.0 | 100.0 | 100.0 | 100.0 | 100.0 | 100.0 | 100.0 | 100.0 |
| Finely divided Sodium Aluminum Silicate Platelike Particles |  | 1.0 | 2.0 | 3.0 | 5.0 | 10.0 | 15.0 | 25.0 | 50.0 | 100.0 |
| Medium thermal Carbon Black | 125.0 | 124.0 | 123.0 | 121.0 | 119.0 | 113.0 | 107.0 | 95.0 | 66.0 |  |
| Petroleum Oil (Circo Oil) | 10.0 | 10.0 | 10.0 | 10.0 | 10.0 | 10.0 | 10.0 | 10.0 | 10.0 | 10.0 |
| Stearic Acid | 0.5 | 0.5 | 0.5 | 0.5 | 0.5 | 0.5 | 0.5 | 0.5 | 0.5 | 0.5 |
| Petrolatum | 1.0 | 1.0 | 1.0 | 1.0 | 1.0 | 1.0 | 1.0 | 1.0 | 1.0 | 1.0 |
| Tetra methyl thiuram mono sulfide | 1.0 | 1.0 | 1.0 | 1.0 | 1.0 | 1.0 | 1.0 | 1.0 | 1.0 | 1.0 |
| Litharge | 10.0 | 10.0 | 10.0 | 10.0 | 10.0 | 10.0 | 10.0 | 10.0 | 10.0 | 10.0 |

Each composition was calendered out on Holland cloth to a thickness of 0.125 inch. The shrinkage test was made by cutting a 5" disc from the uncured sheet and then subjecting to heat as described above. All other tests listed below were made on press cured sheets, which were cured in a pressure mold for forty-five minutes at 307° F. The physical test data for each composition with varying amounts of the siliceous mineral and carbon black are as follows:

of the sodium aluminum silicate to 100 parts of polymer and 50 parts of mineral to 100 parts of polymer. The preferred range is between 2 parts of mineral to 100 parts of polymer and 25 parts of mineral to 100 parts of polymer.

In our investigations of dimensional stabilizing agents for polychloroprene calendered or extruded sheets, a great number of fillers of various sizes and shapes were studied, and it was found that the best results were obtained with those

| Composition | A | B | C | D | E | F | G | H | I | J |
|---|---|---|---|---|---|---|---|---|---|---|
| Maximum shrinkage of 5" disc in any one diameter after heating 15 min. at 212° F. per cent | 12.51 | 2.98 | 1.19 | 1.48 | 2.98 | 3.57 | 4.76 | 3.57 | 3.87 | 2.38 |
| Volume increase after 1 week immersion in 10% aqueous sodium hydroxide at 212° F. do | 0.73 | 0.39 | 0.18 | 0.72 | 0.19 | 0.18 | 0.56 | 1.83 | 3.95 | 51.80 |
| Volume increase after 1 week immersion in 10% hydrochloric acid at 212° F. do | 8.77 | 10.35 | 10.68 | 9.27 | 9.00 | 12.24 | 14.26 | 15.74 | 28.70 | 20.60 |
| Volume increase after 1 week immersion in water at 212° F. do | 6.94 | 5.20 | 6.35 | 6.95 | 5.64 | 7.17 | 7.72 | 5.69 | 18.57 | 25.60 |
| Hardness-Shore A (Scale reading) | 65 | 63 | 64 | 64 | 63 | 64 | 63 | 63 | 64 | 65 |
| Tensile Strength p. s. i. | 1,527 | 1,296 | 1,369 | 1,445 | 1,478 | 1,584 | 1,415 | 1,181 | 1,000 | 853 |
| Modulus at 300% Elongation | 1,445 | 1,407 | 1,329 | 1,404 | 1,451 | 1,327 | 1,205 | 934 | 636 | 308 |
| Ultimate Elongation per cent | 332 | 285 | 315 | 323 | 355 | 355 | 370 | 360 | 458 | 762 |

As will be noted from the tables above, the shrinkage decreases with the addition of the mineral up to about 2–3 parts of mineral to 100 parts of polymer, then increases slightly with additional quantities of the mineral with no substantial change in the shrinkage as quantities are increased beyond 10 parts of mineral to 100 parts of polymer.

The volume increase of the cured sheets after one week immersion in 10% aqueous sodium hydroxide at 212° F. decreases with the addition of the mineral up to about 10 parts of the mineral to 100 parts of polymer, then increases with additional quantities of the mineral.

The volume increase of the cured sheets after one week immersion in water at 212° F. also decreases with the addition of the mineral up to 2–3 parts of mineral to 100 parts of polymer, and then increases with additional quantities of the mineral.

The hardness of the cured sheets is unaffected by varying the ratio of the mineral to polymer.

The tensile strength and modulus at 300% varies inversely with the quantity of the mineral present in the cured sheet. The ultimate elongation increases in proportion with the addition of the mineral.

On the basis of the above data, it is noted that quantities as low as 1 part of the sodium aluminum silicate to 100 parts of polychloroprene result in sheets of reduced shrinkage, as well as quantities as high as 100 parts of the mineral to 100 parts of polymer. Quantities of the mineral greater than 50 parts per 100 parts of polymer adversely effect other desirable properties, such fillers which were plate-like and finely comminuted.

While we do not wish to be limited to any particular theory, it is believed that the flat plates are oriented during the calendering or extruding operation which allows the polymer to be formed in a flat sheet with reduced amount of strains in the film as a result of the flat particles being able to slide over each other.

The preferred elastomer for carrying out the invention is polymerized chloroprene, also known as neoprene. Other elastomers, which are useful in place of neoprene, include, rubber, polyisobutylene, known as "Vistanex," copolymer of butadiene and acrylonitrile known as "Hycar," copolymer of butadiene and styrene known as Buna-S, copolymer of isoprene and polyisobutylene known as GR-1 or Butyl Rubber. In the example the polychloroprene may be replaced by an equal amount of any of these materials. The term "a rubber" is used in the claims to cover natural rubber and the synthetic polymers and copolymers mentioned above.

In describing the preferred embodiment of this invention, reference is made to the calendering process for the forming of the sheet material. The reduction of stresses and strains in sheets may also be accomplished by the extrusion process.

For certain specific uses, such as acid buckets, it is desirable to cover both the inside and outside of a metal container with a corrosion proof covering which is stabilized against dimensional change.

The product of this invention is particularly useful for the protection of metallic containers and ducts in the storage and transportation of corrosive liquids, solids and gases. It is particularly useful in the handling of solid caustic substances, such as solid caustic soda or caustic potash, as well as aqueous solutions of caustic, either diluted or concentrated. The invention is also useful for the lining of ducts conveying corrosive gases, such as sulfur dioxide, sulfur trioxide, hydrochloric acid gas and similar corrosive vapors either in the presence or absence of water vapor.

The finely divided sodium aluminum silicate in the neoprene compositions imparts a matt or dull surface to the sheet material. The finely divided sodium aluminum silicate is also useful as a flatting agent in coating compositions other than neoprene, such as, e. g., polyvinyl chloride, cellulose derivatives, alkyd resins, etc.

The primary advantage is the dimensional stability of the calender sheet without sacrifice of other desirable properties, such as tensile strength, flexibility, rate of cure and resistance to corrosive liquids.

It is apparent that many widely different embodiments of this invention may be made without departing from the spirit and scope thereof, and therefore, it is not intended to be limited except as indicated in the appended claims.

We claim:

1. A calendered sheet comprising a homogeneous mixture of a rubber and a finely divided sodium aluminum silicate, the individual particles of which are substantially flat plates, said silicate having the property to increase the dimensional stability of said sheet.

2. The product of claim 1 in which the sodium aluminum silicate is present in amount between 1 and 50 parts of sodium aluminum silicate to each 100 parts of the rubber.

3. The product of claim 1 in which the sodium aluminum silicate is present in amount between 1 and 25 parts of sodium aluminum silicate to each 100 parts of the rubber.

4. The product of claim 1 in which the sodium aluminum silicate has the following approximate chemical formula $(Na_2O) \, 0.92.Al_2O_3.(SiO_2) \, 8.7.\tfrac{1}{2}H_2O$ 5. A metal container having firmly attached thereto a sheet of a rubber having blended therewith a finely divided sodium aluminum silicate, the individual particles of which are substantially flat plates, said sodium aluminum silicate having the property to increase the dimensional stability of said sheet.

6. The product of claim 5 in which the sodium aluminum silicate is present in amount between 1 and 50 parts of sodium aluminum silicate to 100 parts of the rubber.

7. The product of claim 5 in which the sodium aluminum silicate is present in amount between 1 to 25 parts of sodium aluminum silicate to 100 parts of the rubber.

8. The product of claim 5 in which the sodium aluminum silicate has the following approximate chemical formula $(Na_2O) \, O.92.Al_2O_3.(SiO_2) \, 8.7.\tfrac{1}{2}H_2O$ 9. A calendered sheet comprising a homogeneous mixture of the following mixture:

| | |
|---|---:|
| Polychloroprene | 100.0 |
| Finely divided sodium aluminum silicate plates | 2.5 |
| Medium thermal carbon black | 125.0 |
| Thin lubricating oil | 10.0 |
| Stearic acid | 0.5 |
| Phenyl beta naphthylamine | 1.0 |
| Petrolatum | 1.0 |
| Litharge | 10.0 |
| Tetra methyl thiuram monosulfide | 1.0 |

ALFRED JOSEPH JENNINGS.
VERL EDWARD LUZENA.

REFERENCES CITED

The following references are of record in the file of this patent:

UNITED STATES PATENTS

| Number | Name | Date |
|---|---|---|
| 2,424,813 | Gegner | July 29, 1947 |

OTHER REFERENCES

BL (Blue Sheet) Index, page 26—E. I. du Pont de Nemours and Co., Rubber Chemicals Div., Wilmington, Del., Mar. 1945.

"Bentonite," Bechtner, page 130, article reprinted from Industrial Minerals and Rocks, American Institute of Mining and Metallurgical Engineers, 1937.

"Bentonite Handbook," pages 3 and 4, Silica Products Co., Kansas City, Mo.